(12) United States Patent
Kobayashi et al.

(10) Patent No.: US 11,086,678 B2
(45) Date of Patent: Aug. 10, 2021

(54) INFORMATION PROCESSING DEVICE, METHOD OF PROCESSING INFORMATION, AND METHOD OF PROVIDING INFORMATION

(71) Applicant: SONY CORPORATION, Tokyo (JP)

(72) Inventors: Yoshiyuki Kobayashi, Tokyo (JP); Akira Fukui, Kanagawa (JP); Naoki Ide, Tokyo (JP); Yukio Oobuchi, Kanagawa (JP); Shingo Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 965 days.

(21) Appl. No.: 15/566,284

(22) PCT Filed: Dec. 13, 2016

(86) PCT No.: PCT/JP2016/087116
§ 371 (c)(1),
(2) Date: Oct. 13, 2017

(87) PCT Pub. No.: WO2017/168862
PCT Pub. Date: Oct. 5, 2017

(65) Prior Publication Data
US 2018/0082214 A1    Mar. 22, 2018

(30) Foreign Application Priority Data
Mar. 28, 2016  (JP) .............................. JP2016-063154

(51) Int. Cl.
| G06F 9/50 | (2006.01) |
| G06N 20/00 | (2019.01) |
| G06N 3/08 | (2006.01) |
| G06N 3/02 | (2006.01) |
| G06F 3/048 | (2013.01) |
| G06F 3/0482 | (2013.01) |
| G06F 3/0484 | (2013.01) |

(52) U.S. Cl.
CPC .......... *G06F 9/5011* (2013.01); *G06F 9/5027* (2013.01); *G06F 9/5083* (2013.01); *G06N 3/02* (2013.01); *G06N 3/08* (2013.01); *G06N 20/00* (2019.01); *G06F 3/048* (2013.01); *G06F 3/0482* (2013.01); *G06F 3/0484* (2013.01); *G06F 9/50* (2013.01)

(58) Field of Classification Search
None
See application file for complete search history.

(56) References Cited

U.S. PATENT DOCUMENTS

| 2007/0094168 A1* | 4/2007 | Ayala ..................... G06N 3/105 |
| | | 706/15 |
| 2011/0078303 A1* | 3/2011 | Li ........................ H04L 67/1012 |
| | | 709/224 |
| 2015/0379429 A1 | 12/2015 | Lee et al. |

* cited by examiner

*Primary Examiner* — Qing Yuan Wu
(74) *Attorney, Agent, or Firm* — Paratus Law Group, PLLC

(57) ABSTRACT

There is provided an information processing device capable of intuitively adding a hardware resource intended to execute the learning, the information processing device including: a display control unit configured to control display of information indicating progress of a learning process and an addition button used to add dynamically a second hardware resource intended to execute the learning process to a first hardware resource on which the learning process is being executed.

19 Claims, 17 Drawing Sheets

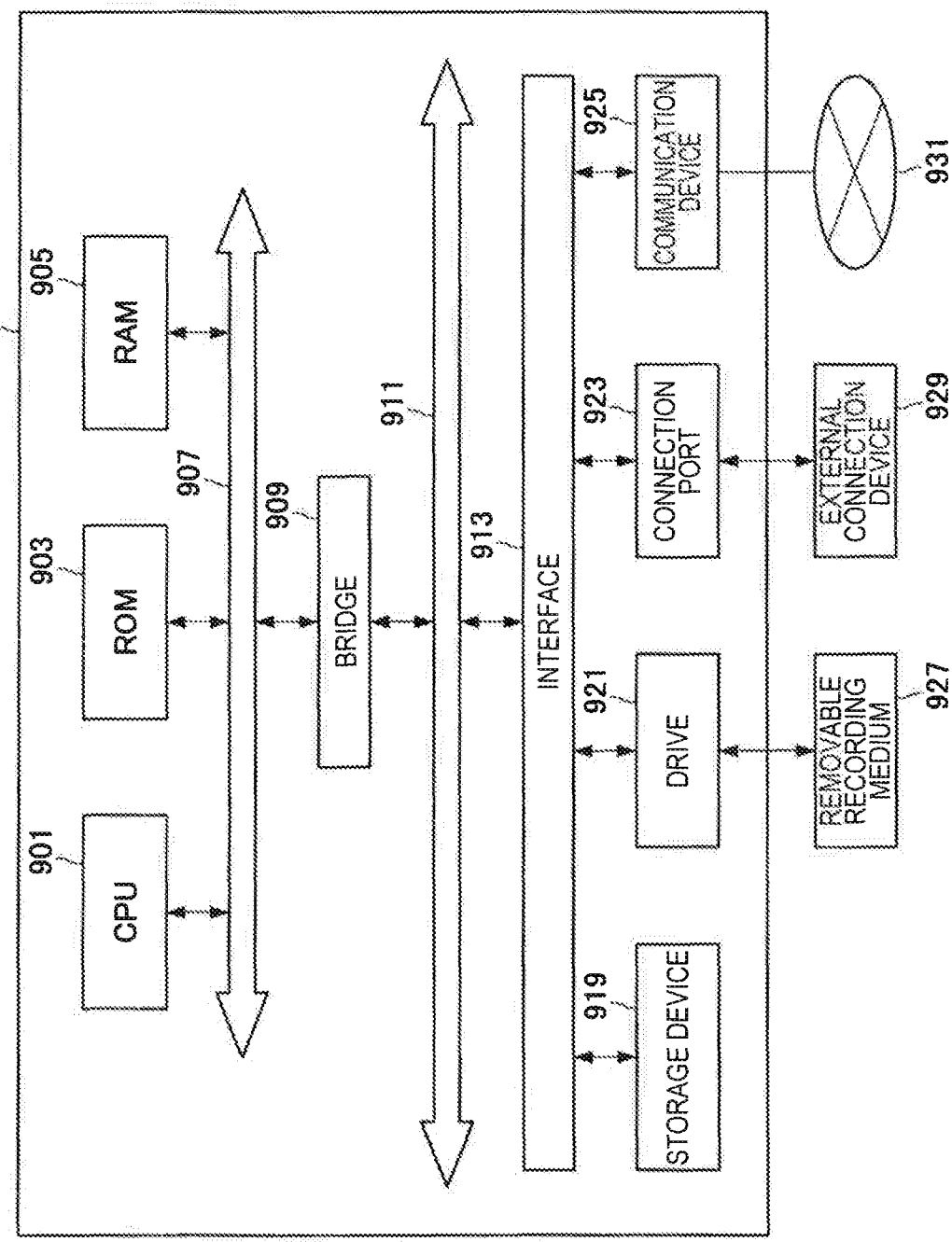

INFORMATION PROCESSING DEVICE, METHOD OF PROCESSING INFORMATION, AND METHOD OF PROVIDING INFORMATION

CROSS REFERENCE TO PRIOR APPLICATION

This application is a National Stage Patent Application of PCT International Patent Application No. PCT/JP/2016/087116 (filed on Dec. 13, 2016) under 35 U.S.C. § 371, which claims priority to Japanese Patent Application No. 2016-063154 (filed on Mar. 28, 2016), which are all hereby incorporated by reference in their entirety.

TECHNICAL FIELD

The present disclosure relates to an information processing device, a method of processing information, and a method of providing information.

BACKGROUND ART

In recent years, there are various technologies as a technique relating to learning using a neural network (e.g., see Patent Literature 1). The neural network is roughly divided into three layers (input, intermediate, and output layers). Among these layers, those having a relatively large number of intermediate layers are called deep learning. The deep learning is applicable to a task with higher difficulty by using a neural network having many intermediate layers.

CITATION LIST

Patent Literature

Patent Literature 1: JP H5-135000A

DISCLOSURE OF INVENTION

Technical Problem

Here, in the learning using a neural network, in some cases, the user may want to add a hardware resource intended to execute the learning in a case where the learning does not progress as expected. Thus, it is desirable to provide a technology capable of intuitively adding a hardware resource intended to execute the learning.

Solution to Problem

According to the present disclosure, there is provided an information processing device including: a display control unit configured to control display of information indicating progress of a learning process and an addition button used to add dynamically a second hardware resource intended to execute the learning process to a first hardware resource on which the learning process is being executed.

According to the present disclosure, there is provided a method of processing information, the method including: controlling, by a processor, display of information indicating progress of a learning process and an addition button used to add dynamically a second hardware resource intended to execute the learning process to a first hardware resource on which the learning process is being executed.

According to the present disclosure, there is provided a method of providing information, the method including: providing information indicating progress of a learning process; and adding, when an addition button used to add dynamically a second hardware resource intended to execute the learning process to a first hardware resource on which the learning process is being executed is pressed, the second hardware resource.

Advantageous Effects of Invention

According to the present disclosure as described above, there is provided a technology capable of intuitively adding a hardware resource intended to execute the learning. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a block diagram illustrating a hardware configuration example of the information providing device.

MODE(S) FOR CARRYING OUT THE INVENTION

Figure 1:
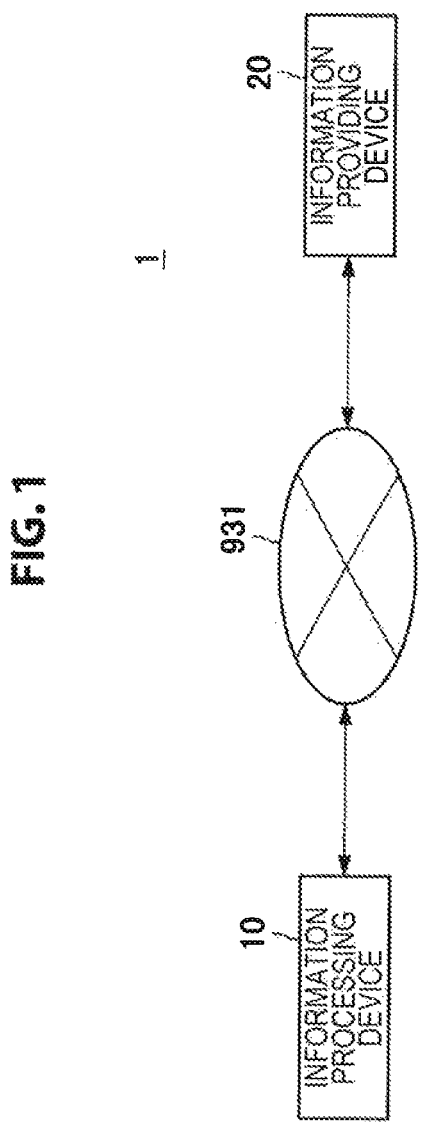
FIG. 1 is a diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated description of these structural elements is omitted.

Note that, in this description and the drawings, structural elements that have substantially the same function and structure are sometimes distinguished from each other using different numerals after the same reference sign. However, when there is no need in particular to distinguish structural elements that have substantially the same function and structure, the same reference sign alone is attached.

Moreover, the description will be given in the following order.
0. Background
1. Embodiment of present disclosure
1.1 System configuration example
1.2. Functional configuration example
1.3. Details of functions of information processing system
1.4. Hardware configuration example
2. Conclusion

0. BACKGROUND

There are various technologies as a technique relating to learning using a neural network (e.g., see JP H5-135000A). The neural network is roughly divided into three layers (input, intermediate, and output layers). Among these layers, those having a relatively large number of intermediate layers are called deep learning. The deep learning is applicable to a task with higher difficulty by using a neural network having many intermediate layers.

Here, in the learning using a neural network, in some cases, the user may want to add a hardware resource intended to execute the learning in a case where the learning does not progress as expected. Thus, in this specification, the technology capable of intuitively adding a hardware resource intended to execute the learning is mainly described. Moreover, in this specification, it is mainly assumed to use deep learning as learning, but the form of learning is not particularly limited to deep learning.

1. EMBODIMENT OF PRESENT DISCLOSURE

1.1. System Configuration Example

A configuration example of an information processing system according to an embodiment of the present disclosure is now described with reference to the drawings. FIG. 1 is a diagram illustrating a configuration example of the information processing system according to an embodiment of the present disclosure. As illustrated in FIG. 1, the information processing system 1 according to the present embodiment is configured to include an information processing device 10 and an information providing device 20. The information processing device 10 and the information providing device 20 are capable of communicating with each other via a communication network 931.

Moreover, in the example illustrated in FIG. 1, the form of the information processing device 10 is not limited to a particular form. In one example, the information processing device 10 may be a game console, a smartphone, a mobile phone, a tablet terminal, and a personal computer (PC). In addition, the information providing device 20 is assumed to be a computer such as a server.

The configuration example of the information processing system 1 according to the present embodiment is described above.

1.2. Functional Configuration Example

Figure 2:
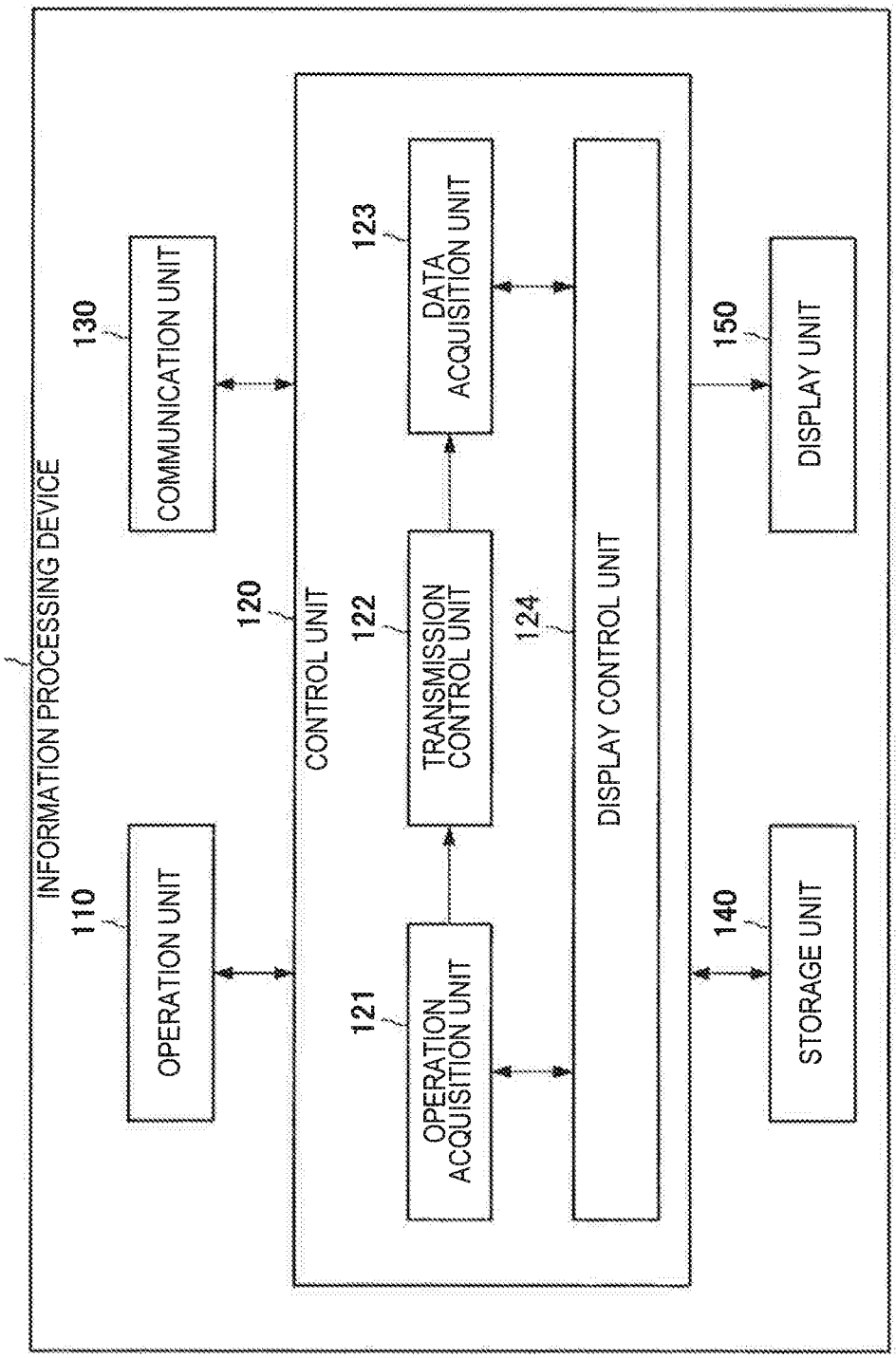
FIG. 2 is a block diagram illustrating a functional configuration example of an information processing device according to the present embodiment.

Subsequently, a functional configuration example of the information processing device 10 according to the present embodiment is described. FIG. 2 is a block diagram illustrating a functional configuration example of the information processing device 10 according to the present embodiment. As illustrated in FIG. 2, the information processing device 10 is configured to include an operation unit 110, a control unit 120, a communication unit 130, a storage unit 140, and a display unit 150. These functional blocks included in the information processing device 10 are described below.

The operation unit 110 has a function of receiving a user's operation. In one example, the operation unit 110 may include an input device such as a mouse and a keyboard. In addition, the operation unit 110 may include a touch panel as long as it has a function of receiving the user's operation. A type of the touch panel to be employed is not limited to a particular type, and may be an electrostatic capacitive, resistive-film, infrared, or ultrasonic type. In addition, the operation unit 110 may include a camera.

The control unit 120 controls the respective units included in the information processing device 10. As illustrated in FIG. 2, the control unit 120 is configured to include an operation acquisition unit 121, a transmission control unit 122, a data acquisition unit 123, and a display control unit 124. Details of these functional blocks equipped in the control unit 120 will be described later. Moreover, the control unit 120 may be composed of, in one example, a central processing unit (CPU), or the like. In the case where the control unit 120 is composed of a processing device such as a CPU, such a processing device may be composed of an electronic circuit.

The communication unit 130 has a function of communicating with the information providing device 20. In one example, the communication unit 130 is composed of a communication interface. In one example, the communication unit 130 is capable of communicating with the information providing device 20 via the communication network 931 (FIG. 1).

The storage unit 140 is a recording medium that stores a program to be executed by the control unit 120 and stores data necessary for execution of the program. In addition, the storage unit 140 temporarily stores data for computation by the control unit 120. The storage unit 140 may be a magnetic storage unit device, a semiconductor storage device, an optical storage device, or a magneto-optical storage device.

The display unit 150 has a function of displaying various types of information. In one example, the display unit 150 may be a liquid crystal display, an organic electro-luminescence (EL) display, or a head-mounted display (HMD). However, the display unit 150 may be other forms of display as long as it has the function of displaying various types of information.

The functional configuration example of the information processing device 10 according to the present embodiment is described above.

Figure 3:
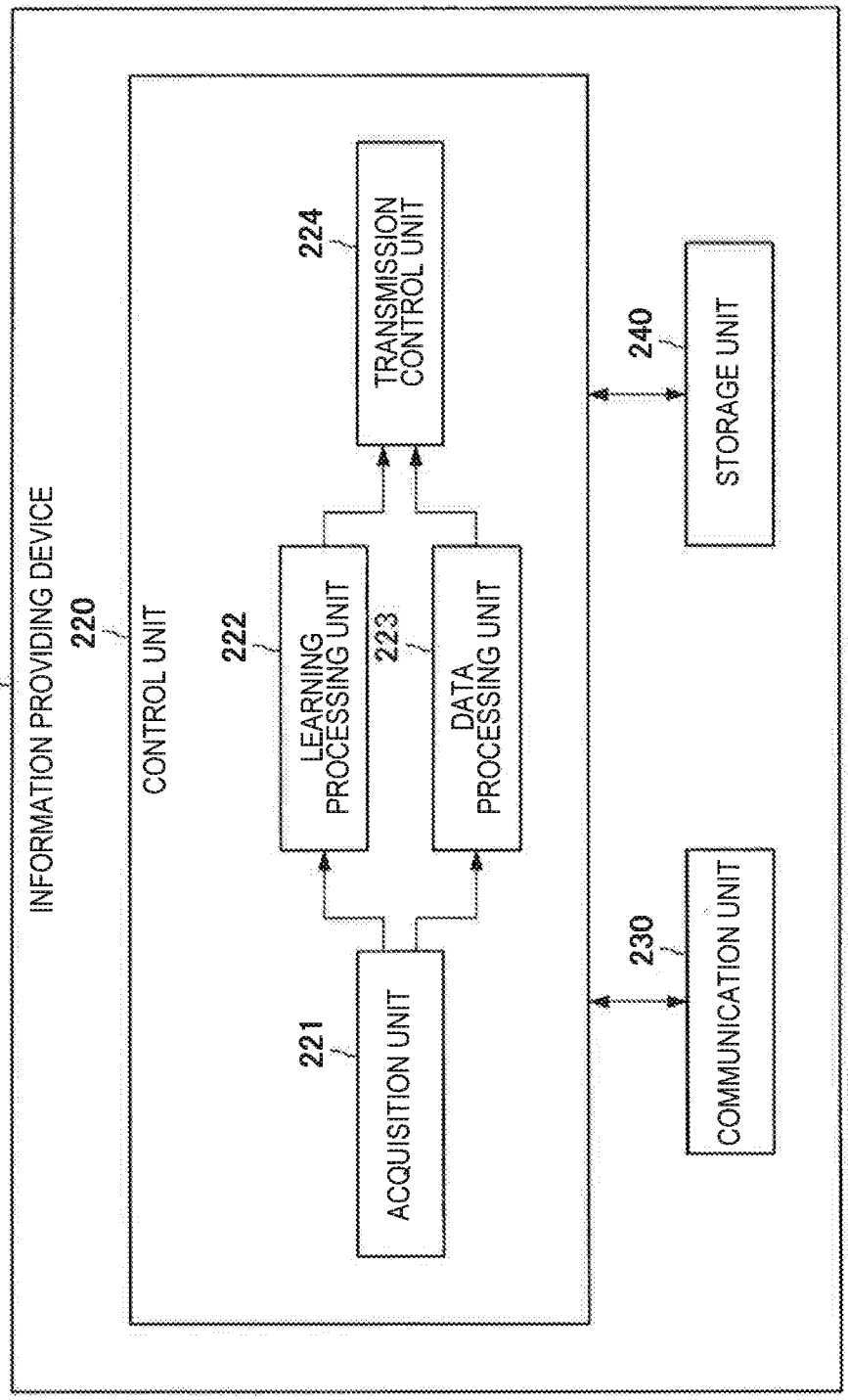
FIG. 3 is a block diagram illustrating a functional configuration example of an information providing device according to the present embodiment.

Subsequently, the functional configuration example of the information providing device 20 according to the present embodiment is described. FIG. 3 is a block diagram illustrating the functional configuration example of the information providing device 20 according to the present embodiment. As illustrated in FIG. 3, the information providing device 20 is configured to include a control unit 220, a communication unit 230, and a storage unit 240. These functional blocks included in the information providing device 20 are described below.

The control unit 220 controls the respective units included in the information providing device 20. As illustrated in FIG. 3, the control unit 220 is configured to include an acquisition unit 221, a learning processing unit 222, a data processing unit 223, and a transmission control unit 224. Details of these functional blocks equipped in the control unit 220 will be described later. Moreover, the control unit 220 may be composed of, in one example, a central processing unit (CPU), or the like. In the case where the control unit 220 is composed of a processing device such as a CPU, such a processing device may be composed of an electronic circuit.

The communication unit 230 has a function of communicating with the information processing device 10. In one example, the communication unit 230 is composed of a communication interface. In one example, the communication unit 230 is capable of communicating with the information processing device 10 via the communication network 931 (FIG. 1).

The storage unit 240 is a recording medium that stores a program to be executed by the control unit 220 and stores data necessary for execution of the program. In addition, the storage unit 240 temporarily stores data for computation by the control unit 220. The storage unit 240 may be a magnetic storage device, a semiconductor storage device, an optical storage device, or a magneto-optical storage device.

The functional configuration example of the information providing device 20 according to the present embodiment is described above.

1.3. Details of Functions of Information Processing System

Subsequently, the details of functions of the information processing system 1 are described. In the information providing device 20, the learning processing unit 222 performs a learning process of a network group to which a learning data set is input, thereby generating a learned network group, and the learned network group to which an evaluation data set is input is evaluated. As a result obtained by evaluating the learned network group, the performance (accuracy) and the computational complexity for each of the learned network groups are obtained.

Furthermore, the learning processing unit 222 searches for a learned network whose performance is higher than a predetermined performance and whose computational complexity is smaller than a predetermined computational complexity. Such learning process, evaluation, and searching for the network group are referred to as network structure automatic search.

The learning process is executed by a first hardware resource (hereinafter also referred to as "single computation node"). The transmission control unit 224 controls transmission of information (total learning process throughput and completed learning throughput), which indicates progress of the learning process by the learning processing unit 222, to the information processing device 10. In the information processing device 10, the data acquisition unit 123 acquires the information indicating the progress via the communication unit 130.

Figure 4:
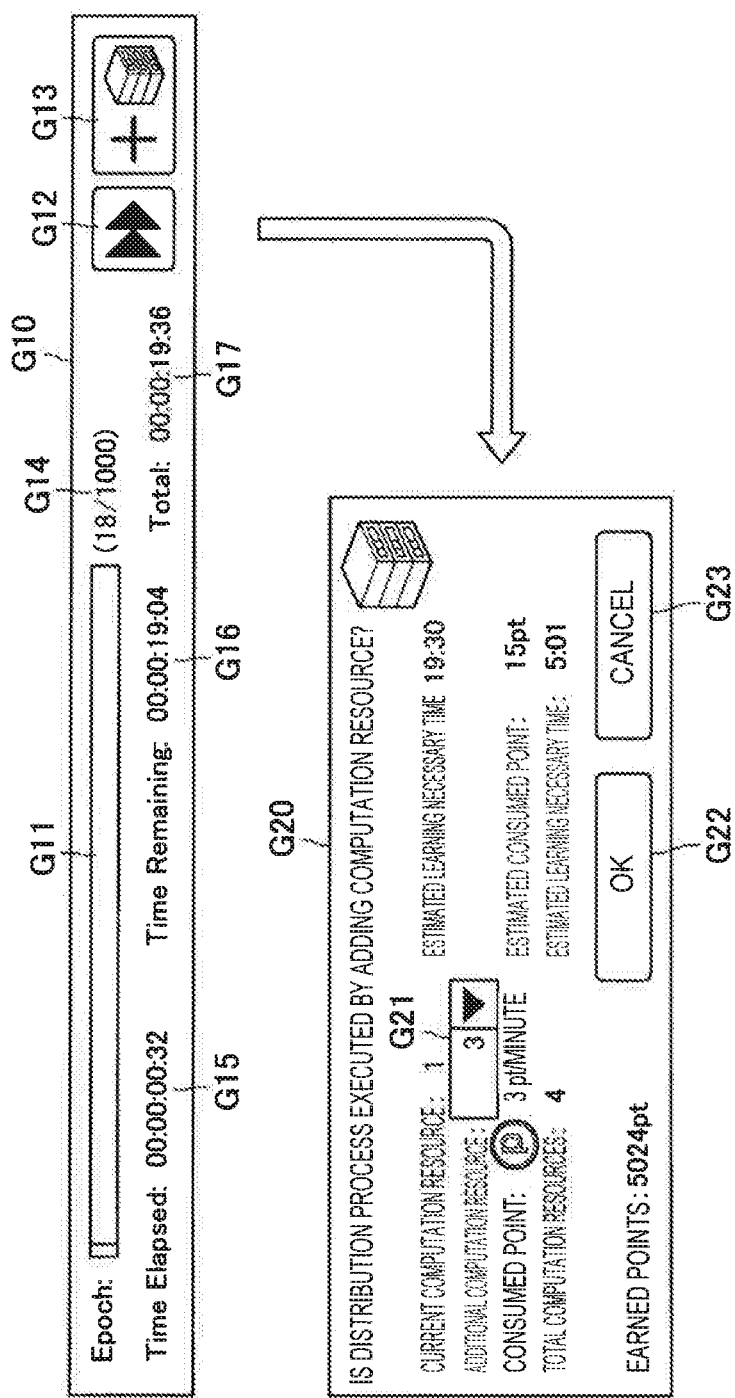
FIG. 4 is a diagram illustrating a first example of a screen displayed on the information processing device.

FIG. 4 is a diagram illustrating a first example of a screen displayed on the information processing device 10. As illustrated in FIG. 4, the display control unit 124 controls display of a progress screen G10 corresponding to the information indicating the progress acquired by the data acquisition unit 123. The progress screen G10 includes a progress bar G11 indicating the progress, a progress rate G14 indicating a ratio of the completed learning process to the entire learning process, an elapsed time G15 from the start of learning, a remaining learning process time G16, and a total learning process time G17.

In a case where the learning process does not progress as expected during checking the information indicating the progress, in some cases the user may want to add a second hardware resource (hereinafter referred to as "additional computation node") to improve the speed of the learning process. Thus, the display control unit 124 controls display of an addition button used to add dynamically an additional computation node intended to execute the learning process when the learning process is being executed. This makes it possible for the user to add intuitively the additional computation node intended to execute the learning process.

In one example, the display control unit 124 controls display of a distributed computation resource addition button (first addition button) G12, which is used to execute a learning process of an identical network in a distributed manner between the single computation node and the additional computation node, as the addition button. In addition, the display control unit 124 controls display of a parallel computation resource addition button (second addition button) G13, which is used to execute learning processes of different networks in parallel between the single computation node and the additional computation node, as the addition button.

The operation acquisition unit 121 is capable of acquiring the user's operation through the operation unit 110. First, the distributed computation resource addition button G12 is assumed to be pressed. In this event, the operation acquisition unit 121 detects whether the distributed computation resource addition button G12 is pressed through the operation unit 110. In the case where the operation acquisition unit 121 detects that the distributed computation resource addition button G12 is pressed, the display control unit 124 may control the display of a distributed computation check screen G20.

As illustrated in FIG. 4, the learning process is performed currently by the single computation node, so the display control unit 124 may control the display of "1" as the number of current computation resources. In addition, as illustrated in FIG. 4, the display control unit 124 may control the display of a time of "19 minutes and 30 seconds", which is estimated to be necessary for the learning process (hereinafter also referred to as "estimated learning necessary time") in the case where the learning process is performed by the current computation resource. Moreover, the display of an estimated learning end time, instead of or in addition to the estimated learning necessary time, may be controlled.

Further, the user is able to specify the number of additional computation resources on the distributed computation check screen G20. There is a case where the user performs an operation of specifying "3" as the number of additional computation resources in an additional computation resource number specifying field G21 and the operation acquisition unit 121 acquires the operation of specifying the number of additional computation resources. In this case, the display control unit 124 controls the display of "4", as the number of total computation resources (sum of the numbers of single computation node and additional computation node).

Further, as illustrated in FIG. 4, the display control unit 124 may control the display of the estimated learning necessary time, "5 minutes and 01 seconds", in the case where the learning process is performed by the total computation resources on the basis of the number of total computation resources. Moreover, the display of the estimated learning end time, instead of or in addition to the estimated learning necessary time, may be controlled. In other words, the display control unit 124 may control the display of at least one of the estimated learning necessary time and the estimated learning end time on the basis of the number of total computation resources.

Further, during execution of the learning process by the additional computation resource, the cost corresponding to the number of additional computation resources is subtracted from the balance at predetermined time intervals. The following description is given on the assumption that a point is taken as an example of the cost and the earned point of the user is taken as an example of the balance. However, the cost is not limited to a point, and may be currency or the like. The point will be described by taking as an example of the case where the user spends on purchases in a prepaid manner, but the user may be billed in a postpaid manner after use of points. The display control unit 124 may control the display of the cost corresponding to the number of additional computation resources.

In one example, the display control unit 124 displays a consumed point taken at predetermined time intervals (in the example illustrated in FIG. 4, consumed point, "3 points per minute") and an estimated consumed point taken until the learning process is completed (in the example illustrated in FIG. 4, estimated consumed point, "15 points"). Moreover, in the example illustrated in FIG. 4, both the consumed point taken at predetermined time intervals and the estimated consumed point are displayed. However, at least one of the consumed point taken at predetermined time intervals and the estimated consumed point taken until the learning process is completed may be displayed.

Further, the display control unit 124 may control the display of the earned point of the user, "5024 points". This allows the user to determine the number of additional operation resources on the basis of a result obtained by checking the displayed earned point. The distributed computation check screen G20 includes an OK button G22 and a cancel button G23. In the case where the OK button G22 is detected to be pressed, the learning processing unit 222 may add a computation node.

More specifically, in the case where the operation acquisition unit 121 detects that the OK button G22 is pressed, the learning processing unit 222 may add an additional operation node intended to execute a learning process of a network to be subjected to the learning process being executed by the single operation node so that the learning process is distributed between additional operation node and the single operation node. Moreover, the description in this specification is mainly given of an example in which an additional computation node is added in the case where that the OK button G22 is detected to be pressed. However, in the case where the distributed computation check screen G20 is not displayed, the additional computation node may be added when the distributed operation resource addition button G12 is detected to be pressed.

Further, it is preferable for the learning process to pause to change the number of computation nodes. In other words, in the case the operation acquisition unit 121 detects that the OK button G22 is pressed, the learning processing unit 222 may hold its state until the learning process being executed by the single computation node can be paused. When the learning process can be paused, the learning processing unit 222 may distribute the single computation between the single computation node and as many of the additional computation nodes as the user-specified number so that these nodes execute the single computation.

Further, in a case where the earned point of the user falls below a predetermined value, it is preferable to stop the learning by the additional computation resource. In other words, in a case where the earned point of the user falls below a predetermined value, the learning processing unit 222 may hold its state until the learning process being executed by the single computation node can be paused. Then, the learning processing unit 222 may stop the learning process executed by the additional computation node and may cause the single computation node to resume the learning process.

On the other hand, in a case where the cancel button G23 is detected to be pressed, the display control unit 124 may close the distributed computation check screen G20 without addition of a computation node.

Figure 5:
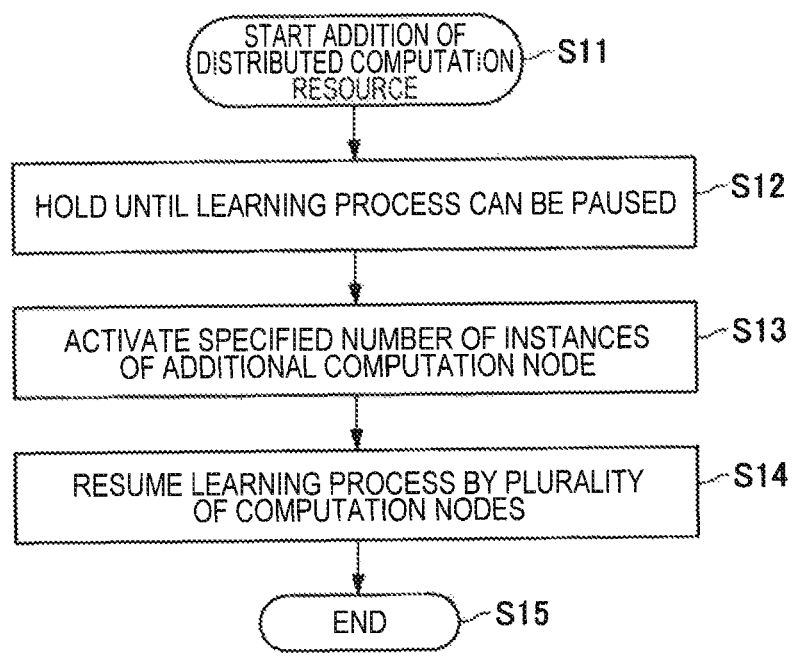
FIG. 5 is a flowchart illustrating an operation example in a case where a distributed computation resource addition button is detected to be pressed.

Subsequently, an operation example in the case where distributed computation resource addition button G12 is detected to be pressed and the OK button G22 is detected to be pressed is described. FIG. 5 is a flowchart illustrating an operation example in the case where the distributed computation resource addition button G12 is detected to be pressed. The single computation node executes the learning process by the learning processing unit 222 before it is detected that the distributed computation resource addition button G12 is pressed.

If the operation acquisition unit 121 detects that the distributed computation resource addition button G12 is pressed (and the OK button G22 is pressed) (S11), the transmission control unit 122 controls the transmission of a distributed computation resource addition request to the information providing device 20. In the information providing device 20, if the acquisition unit 221 acquires the distributed computation resource addition request, the learning processing unit 222 holds its state until the learning process can be paused (S12).

Subsequently, the learning processing unit 222 activates an instance of an additional operation node, which executes a learning process of a network to be subjected to the learning process being executed by the single operation node by distributing it between the single operation node and the additional operation node (S13). In this case, the number of instances to be activated is specified by the user. Then, the learning processing unit 222 causes the learning process to be resumed by a plurality of computation nodes (single computation node and additional computation node) (S14). Subsequently, the operation performed in the case where it is detected that the distributed computation resource addition button G12 is pressed and the OK button G22 is pressed is ended (S15).

Figure 6:
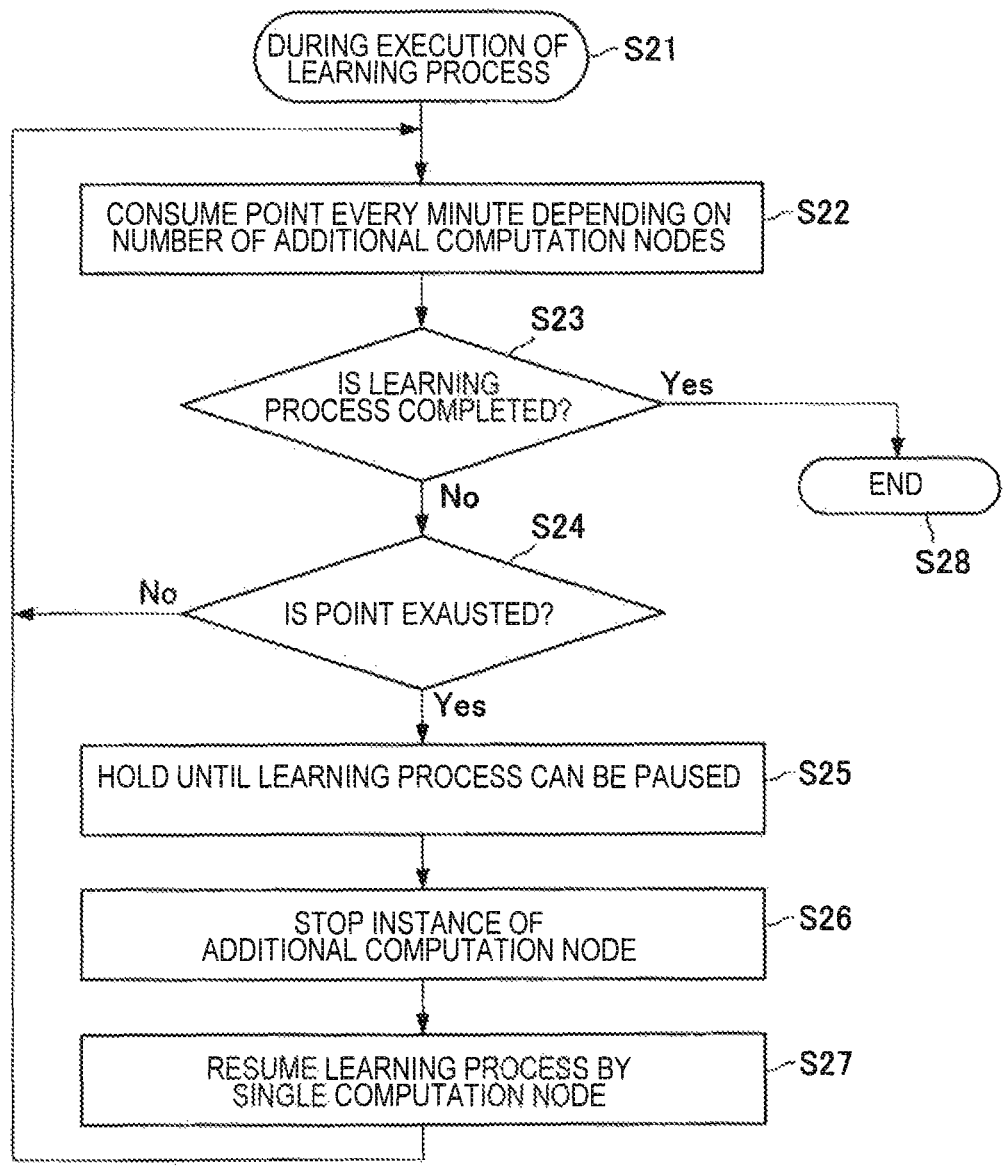
FIG. 6 is a flowchart illustrating an example of a learning process executed after adding a distributed computation node.

FIG. 6 is a flowchart illustrating an example of a learning process executed after addition of the distributed computation node. During execution of the learning (S21), the data processing unit 223 consumes a point every minute depending on the number of additional computation nodes from the earned point of the user (S22). In a case where the learning process is completed ("Yes" in S23), the learning processing unit 222 ends the learning process (S23).

On the other hand, in a case where the learning process is not completed ("No" in S23), if the earned point of the user is not exhausted ("No" in S24), the learning processing unit 222 shifts the operation to S22. However, in this case, if the earned point of the user is exhausted ("Yes" in S24), the learning processing unit 222 holds its state until the learning process can be paused (S25).

Moreover, in this case, it is assumed to determine whether the earned point of the user is completely exhausted, but it may be determined whether the earned point of the user is likely to be exhausted. In other words, it may be determined whether the earned point of the user falls below a predetermined value. Subsequently, in the case where the learning process can be paused, the learning processing unit 222 stops the instance of the additional computation node (S26), causes the single computation node to resume the learning process (S27), and shifts the operation to S22.

Figure 7:
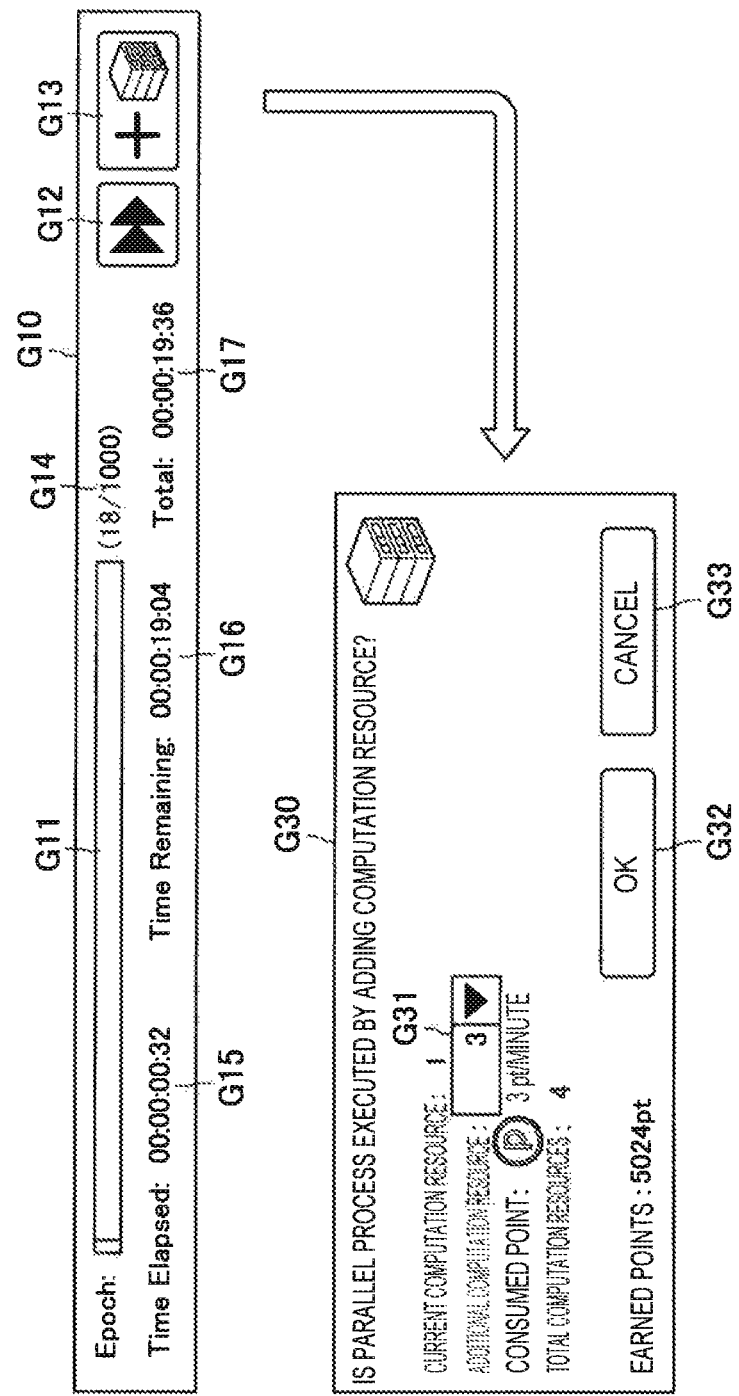
FIG. 7 is a diagram illustrating a second example of a screen displayed on the information processing device.

The operation example in the case where distributed computation resource addition button G12 is detected to be pressed and the OK button G22 is detected to be pressed is described above. Subsequently, it is assumed that the parallel computation resource addition button G13 is pressed. FIG. 7 is a diagram illustrating a second example of a screen displayed on the information processing device 10. As illustrated in FIG. 7, the display control unit 124 controls the display of the progress screen G10 depending on the information indicating the progress acquired by the data acquisition unit 123.

In this event, the operation acquisition unit 121 detects whether the parallel computation resource addition button G13 is pressed through the operation unit 110. If the operation acquisition unit 121 detects that the parallel computation resource addition button G13 is pressed, the display control unit 124 may control the display of a parallel computation check screen G30.

As illustrated in FIG. 7, the learning process is currently performed by the single computation node, so the display control unit 124 may control the display of "1" as the number of current computation resources. In addition, the user is able to specify the number of additional computation resources on the parallel computation check screen G30. There is a case where the user performs an operation of specifying "3" as the number of additional computation resources in an additional computation resource number specifying field G31 and the operation acquisition unit 121 acquires the operation of specifying the number of additional computation resources. In this case, the display control unit 124 controls the display of "4" as the number of total computation resources (the sum of single computation node and additional computation node).

The display control unit 124 may control the display of a consumed point (in the example illustrated in FIG. 7, the consumed point, "3 points per minute") taken at predetermined time intervals. In addition, the display control unit 124 may control display of the earned point of the user, "5024 points". Then, the user is able to determine the number of additional operation resources on the basis of the result obtained by checking the displayed earned point. The parallel computation check screen G30 includes an OK button G32 and a cancel button G33. In a case where the OK button G32 is detected to be pressed, the learning processing unit 222 may add a computation node.

More specifically, in the case where the operation acquisition unit 121 detects that the OK button G32 is pressed, the learning processing unit 222 may add an additional operation node intended to execute a learning process of a network different from the network to be subjected to the learning process being executed by the single operation node in parallel with the learning process executed by the single operation node. Moreover, the description in this specification is mainly given of an example in which an additional computation node is added in the case where the OK button G32 is detected to be pressed. However, in the case where the parallel computation check screen G30 is not displayed, the additional computation node may be added when the parallel operation resource addition button G13 is detected to be pressed.

Further, in the case where the operation acquisition unit 121 detects that the OK button G332 is pressed and there are one or more paused learning processes, the learning processing unit 222 may assign some or all of the additional operation nodes to each of the paused learning processes one by one. Then, the learning processing unit 222 may cause the additional computation node assigned to the paused learning process to resume the paused learning process. In this way, it is possible to utilize effectively the learning process executed halfway.

On the other hand, the learning processing unit 222 may cause each of the additional computation nodes that are not assigned to the paused learning process to individually execute the learning process of the network.

Further, in the case where the earned point of the user falls below the predetermined value, it is preferable to stop the learning by the additional computation resources. In other words, in the case where the earned point of the user falls below the predetermined value, the learning processing unit 222 preferably stops the learning process by the additional computation node.

On the other hand, in the case where the cancel button G33 is detected to be pressed, the display control unit 124 may close the parallel computation check screen G30 without addition of a computation node.

Figure 8:
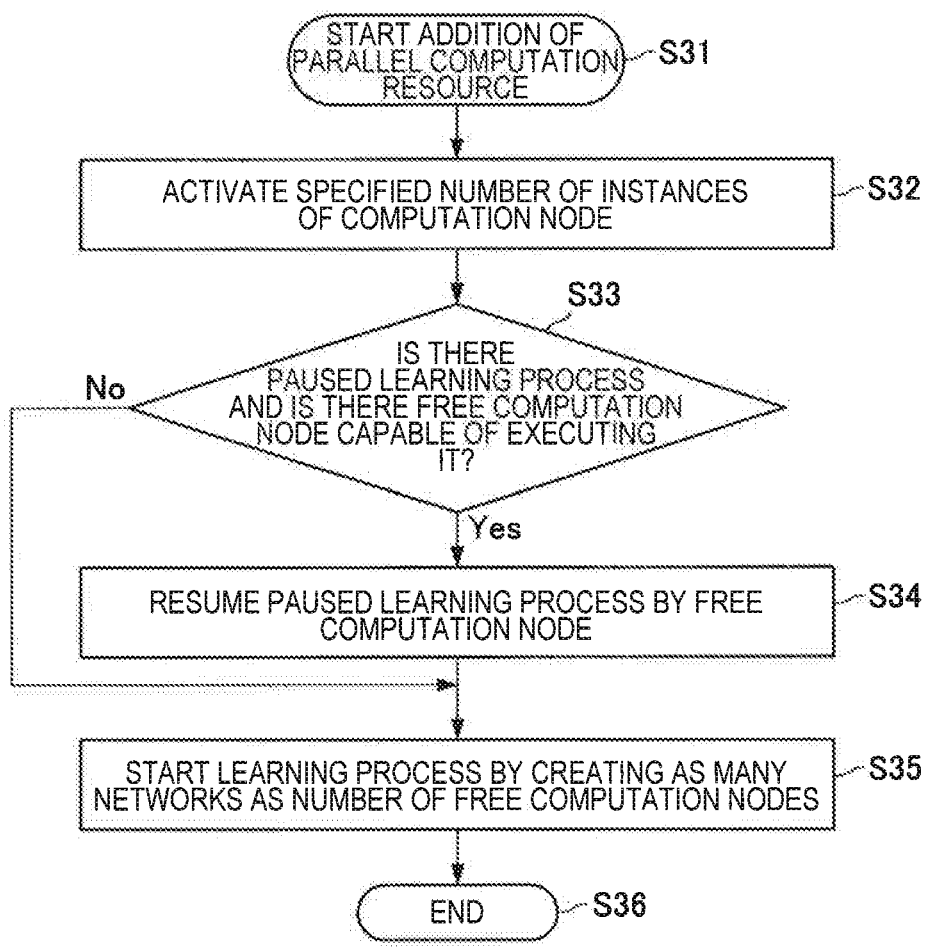
FIG. 8 is a flowchart illustrating an operation example in a case where a parallel computation resource addition button is detected to be pressed.

Subsequently, an operation example in the case where the parallel computation resource addition button G13 is detected to be pressed and the OK button G32 is detected to be pressed is described. FIG. 8 is a flowchart illustrating an operation example in the case where the parallel computation resource addition button G13 is detected to be pressed. The single computation node executes the learning process by the learning processing unit 222 before it is detected that the parallel computation resource addition button G13 is pressed.

If the operation acquisition unit 121 detects that the parallel computation resource addition button G13 is pressed (and the OK button G32 is pressed) (S31), the transmission control unit 122 controls the transmission a parallel computation resource addition request to the information providing device 20. In the information providing device 20, if the acquisition unit 221 acquires the parallel computation resource addition request, the learning processing unit 222 activates as many of the instances of the additional computation node as the user-specified number (S32).

Then, if there is a paused learning process and there is no free computation node capable of executing the paused learning process ("No" in S33), the learning processing unit 222 shifts the operation to S35. On the other hand, if there is a paused learning process and there is a free computation node capable of executing the paused learning process ("Yes" in S33), the learning processing unit 222 causes the free computation node to resume the paused learning process (S34). This reduces the number of free computation nodes.

Subsequently, the learning processing unit 222 creates as many networks as the number of free computation nodes and starts a learning process of the created network (S35). Subsequently, the operation in the case where the parallel computation resource addition button G13 is detected to be pressed and the OK button G32 is detected to be pressed is ended (S36).

Figure 9:
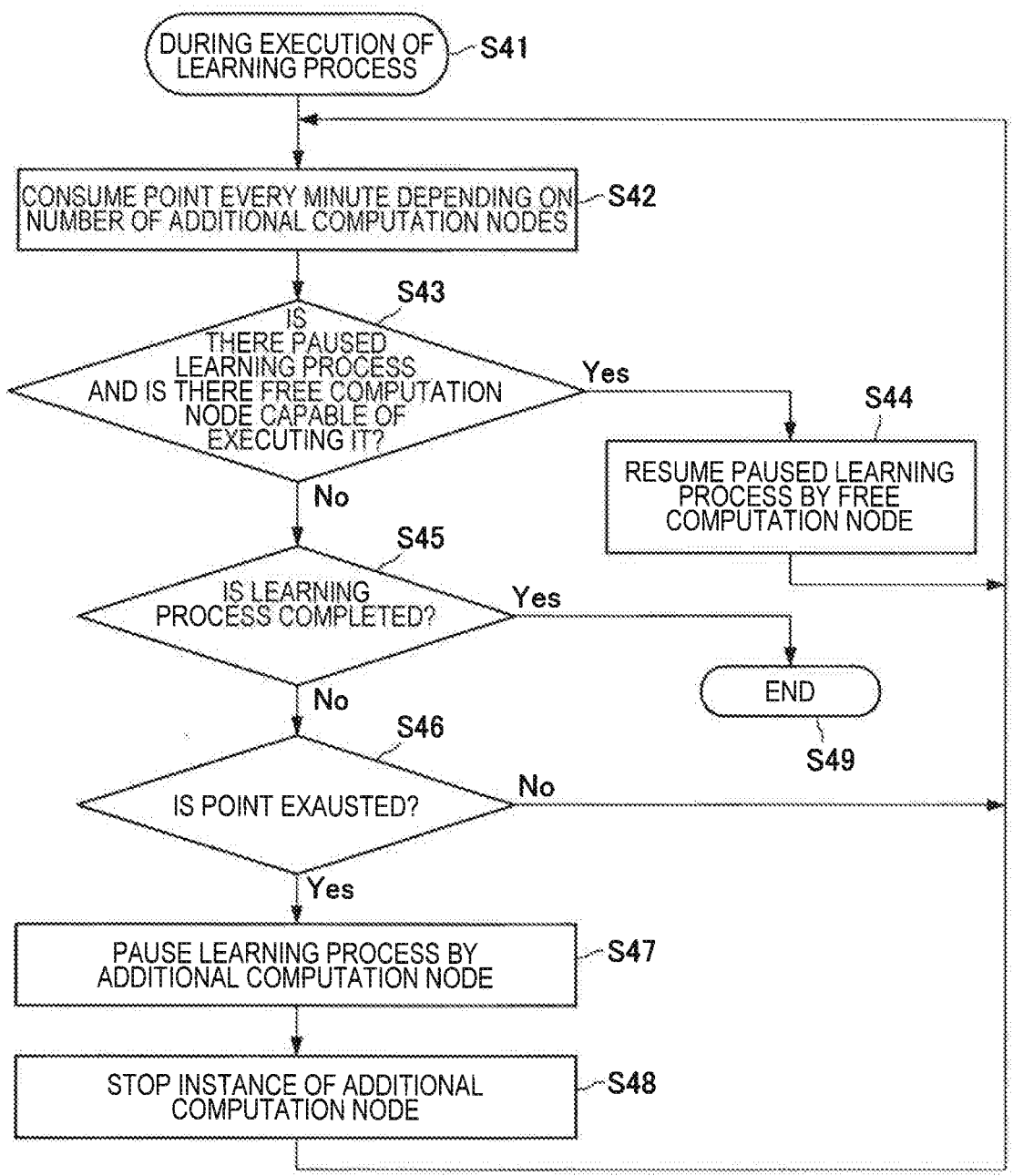
FIG. 9 is a flowchart illustrating an example of a learning process executed after adding a parallel computation node.

FIG. 9 is a flowchart illustrating an example of a learning process executed after addition of a parallel computation node. During execution of the learning (S41), the data processing unit 223 consumes a point every minute depending on the number of additional computation nodes from the earned point of the user (S42). If there is a paused learning process and there is a free computation node capable of executing the paused learning process ("Yes" in S43), the learning processing unit 222 causes the free computation node to resume the paused learning process (S44) and shifts the operation to shift to S42.

On the other hand, if there is no paused learning process or there is no free computation node capable of executing the paused learning process ("No" in S43), the learning processing unit 222 shifts the operation to S45. If the learning process is completed ("Yes" in S45), the learning processing unit 222 ends the learning process (S49).

On the other hand, in the case where the learning process is not completed ("No" in S45), if the earned point of the user is not exhausted ("No" in S46), the learning process unit 222 shifts the operation to S42 ("Yes" in S46). However, in this case, if the earned point of the user is exhausted ("YES" in S46), the learning process unit 222 pauses the learning process by the additional operation node (S47), stops the instance of the additional operation node (S48), and shifts the operation to S42.

Moreover, in this case, it is assumed that it is determined whether the earned point of the user is completely exhausted, but it may be determined whether the earned point of the user is likely to be exhausted. In other words, it may be determined whether the earned point of the user falls below a predetermined value.

The operation example in the case where the parallel computation resource addition button G13 is detected to be pressed and the OK button G32 is detected to be pressed is described above.

The above description is given of the case where the earned point of the user is subtracted depending on the number of additional computation nodes. On the other hand, the earned point of the user can be increased appropriately. In one example, in the case where the operation acquisition unit 121 detects an operation for increasing the earned point of the user, the data processing unit 223 may execute an addition process on the earned point of the user. In one example, the addition process on the earned point of the user may be performed by using the point purchase as a trigger. In one example, the point purchase may be made by prepaid method.

Figure 10:
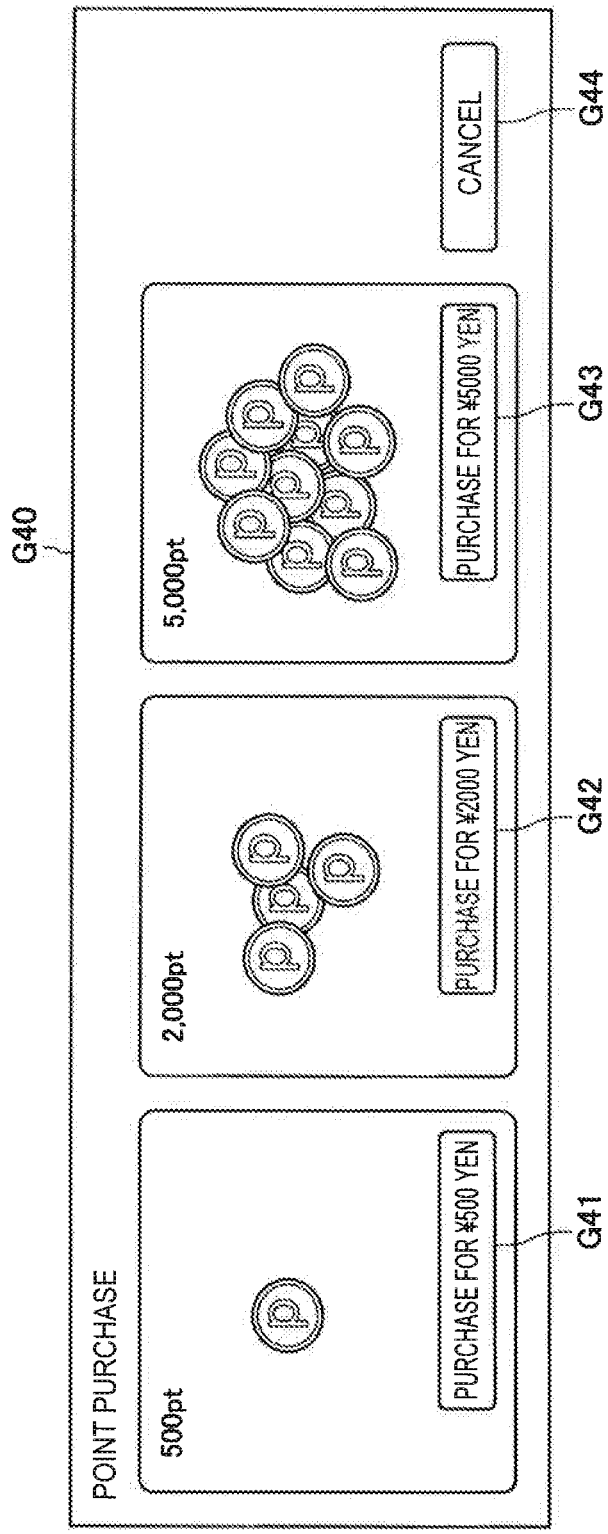
FIG. 10 is a diagram illustrating an example of a point purchase screen.

FIG. 10 is a diagram illustrating an example of a point purchase screen. In one example, if the operation acquisition unit 121 detects a predetermined point purchase operation by the user, the display control unit 124 controls the display of a point purchase screen G40. In the example illustrated in FIG. 10, a purchase button G41 used to purchase 500 points for 500 yen, a purchase button G42 used to purchase 2000 points for 2,000 yen, and a purchase button G43 used to purchase 5000 points for 5,000 yen are displayed.

In one example, if the purchase button G41 is detected to be pressed, the data processing unit 223 subtracts 500 yen from a predetermined balance of the user, adds 500 yen to a predetermined balance on the service side, and adds 500 points to the earned point of the user. Similarly, it the purchase button G42 is detected to be pressed, the data processing unit 223 subtracts 2,000 yen from the predetermined balance of the user, adds 2,000 yen to the predetermined balance on the service side, and adds 2000 points to the earned point of the user. In addition, if the purchase button G43 is detected to be pressed, the data processing unit 223 subtracts 5,000 yen from the predetermined balance of the user, adds 5,000 yen to the predetermined balance on the service side, and adds 5000 points to the earned point of the user.

Moreover, in FIG. 10, an example in which it costs 1 yen to purchase per point is illustrated, but correspondence between points and amounts is not limited to the particular relationship. In addition, the types of points available for purchase are not limited to 500 points, 2000 points, and 5000 points. The point purchase screen G40 also includes a cancel button G44. In the case where the cancel button G44 is detected to be pressed, the display control unit 124 may close the point purchase screen G40 without purchasing points.

Further, here, an example is illustrated in which the display control unit 124 controls the display of the point purchase screen G40 in the case where the operation acquisition unit 121 detects a predetermined point purchase operation performed by the user. However, the timing at which the display control of the point purchase screen G40 is performed is not limited to this example. In one example, there is a case where the earned point of the user falls below the predetermined value during execution of the learning process by the additional computation node. In this case, the display control unit 124 may control display of the point purchase screen G40, thereby prompting the user to purchase points, oft causing the additional operation node to pause the learning process. In this case, if a point is purchased, the learning process by the additional computation resources may be resumed.

The above description is based on the assumption that the user who causes the learning process to be performed uses the result of the learning, but the learning result may be shared to others. In other words, in the case where a share button used to share the learning result of the network on a predetermined publishing screen is detected to be pressed, the data processing unit 223 may share the network structure and the data set used for the learning process or identification information of the data set and the performance of the network structure in a range specified by the user.

Figure 11:
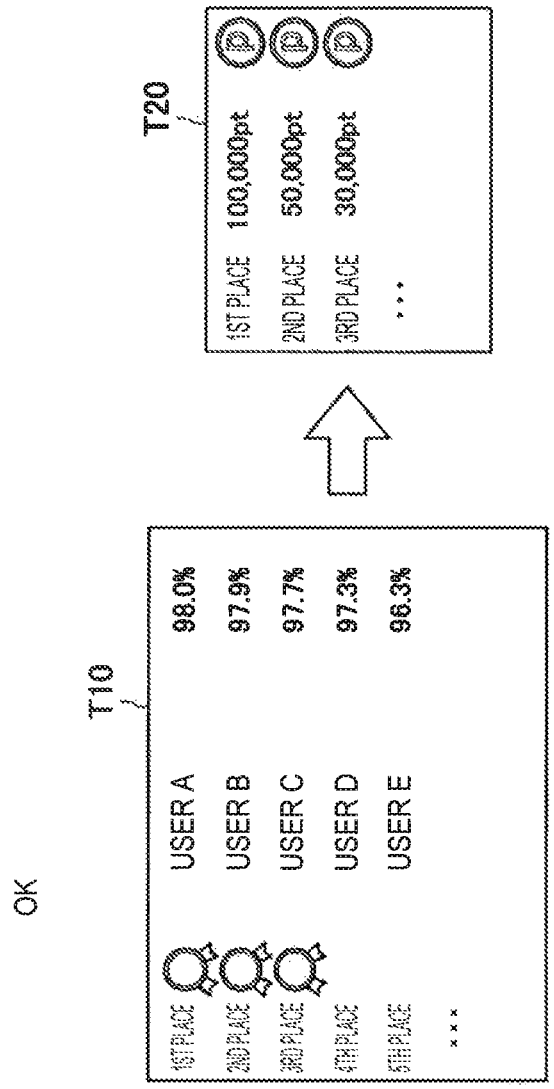
FIG. 11 is a diagram illustrated to describe an example of addition process to an earned point by publishing a learning result.

Then, in the case where the share button is detected to be pressed, the data processing unit 223 may cause addition process on the earned point of the user (points reward to the user) to be performed. FIG. 11 is a diagram illustrated to describe an example of the addition process on the earned point by publishing the learning result. In one example, the data processing unit 223 generates a ranking table T10 in which the names of users who have published the learning results in a predetermined period (e.g., monthly) are arranged in order of high performance of the network. In addition, a correspondence table T20 between the network performance ranks and points is prepared in advance.

Here, the data processing unit 223 may add the point to the earned point of the user placed in the order in which the points are described in the correspondence table T20. This allows the research motivations of the user who intends to publish the learning result to be promoted and the efficiency of the network search by other users using the learning result to be improved. Moreover, the performance of each network may be calculated by the learning processing unit 222 (e.g., the average value of the performance obtained by performing a plurality of learning processes on one network may be calculated as the performance of the network).

Figure 12:
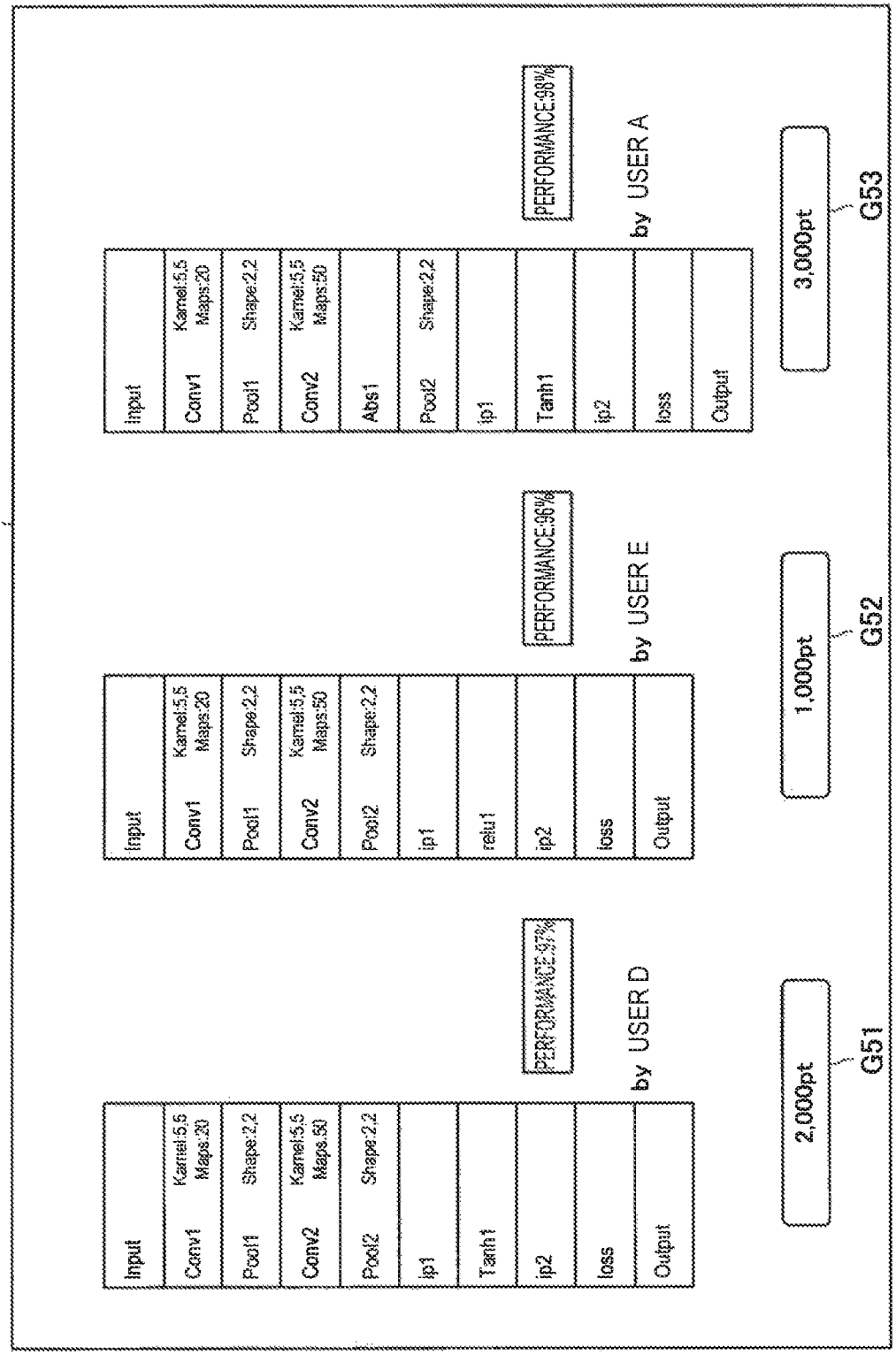
FIG. 12 is a diagram illustrating an example of a learned network purchase screen.

Further, a function of making it possible to provide a learned network at a cost for publishing may be provided. More specifically, when the user performs a predetermined learned network purchase operation and the operation acquisition unit 121 detects the operation, the display control unit 124 controls the display of a learned network purchase screen. FIG. 12 is a diagram illustrating an example of a learned network purchase screen. As illustrated in FIG. 12, a learned network purchase screen G50 includes a combination of structure of the learned network, performance of the learned network, name of the publisher of the learned network, and purchase points.

Specifically, the learned network purchase screen G50 includes a purchase button G51 corresponding to the first learned network, a purchase button G52 corresponding to the second learned network, and a purchase button G53 corresponding to the third learned network. However, the number of purchasable learned networks is not limited. In one example, the data processing unit 223 may be capable of selectively purchasing a learned network having performance exceeding the predetermined performance, or may be capable of selectively purchasing a learned network showing a public intention. In addition, a function of allowing a publisher to set purchase points of the learned network.

When the user performs a predetermined purchase operation on the learned network and the operation acquisition unit 121 detects the operation, the data processing unit 223 may subtract a predetermined purchase point from the earned point of the user and may provide the user with the learned network. This makes it possible for the user to obtain the high-performance technology (e.g., the image recognition technology) without having to perform a new learning process.

In one example, when it is detected that the user presses the purchase button G51, the data processing unit 223 subtracts 2000 points from the earned point of the user and provides the user with the learned network corresponding to the button. Similarly, when it is detected that the user presses the purchase button G52, the data processing unit 223 subtracts 1000 points from the earned point of the user and provides the user with the learned network corresponding to the button. In addition, when it is detected that the user presses the purchase button G53, the data processing unit 223 subtracts 3000 points from the earned point of the user and provides the user with the learned network corresponding to the button.

Further, in a case where the user purchases a learned network, the data processing unit 223 may add a part of the sales points (e.g., 70%, etc.) to the earned point of the publisher (alternatively, a part of the sales (e.g., 70%) may be added to the predetermined balance held by the publisher). In this way, it is possible to promote learned network publication by giving the publisher the benefit to the learned network publication.

Further, the user, when selling a learned network, may attach information for allowing the user to notify the learned network that the user is the creator of the learned network (e.g., a character string such as a name). This makes it possible to prevent other users from uploading falsely the learned network by assuming a creator of the learned network.

Moreover, the display control unit 124 may control the display of the structure of the learned network and the problem to be solved by the learned network. In one example, the problem to be solved by the learned network may be entered from the publisher in the form of text data. Then, the user who purchases the learned network is able to purchase a learned network with high similarity to the problem to be solved, while seeing the problem to be solved.

Here, a label is necessary to be attached more accurately to the input data (particularly, data set for evaluation) used for the learning process. In view of this, in a case where the operation acquisition unit 121 detects attachment or change of a label to the input data used for learning process, the data processing unit 223 performs addition process on the earned point of a user who attaches or changes a label. This makes it possible to prompt users to attach or change a label.

Figure 13:
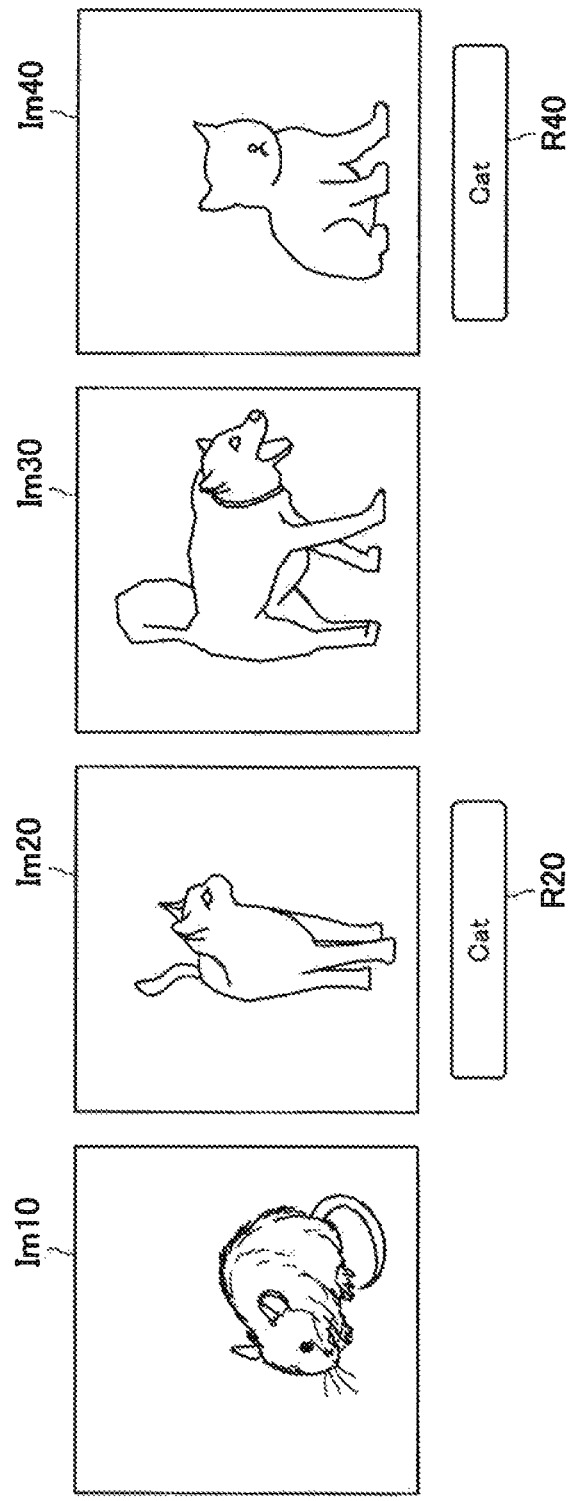
FIG. 13 is a diagram illustrated to describe addition of a label to input data.

FIG. 13 is a diagram illustrated to describe attachment of a label to the input data. As illustrated in FIG. 13, the display control unit 124 controls the display of input data Im10, input data Im20, input data Im30, and input data Im40. In the example illustrated in FIG. 13, the input data Im10 is a hamster image, the input data Im20 is a cat image, the input data Im30 is a dog image, and the input data Im40 is a cat image. However, the types of input data are not limited to particular type, and it may be voice data, sensor data detected by a sensor, text data, or other kind of data.

The timing at which these input data types are displayed is also not limited. In one example, in a case where a predetermined label editing operation by the user is detected, the display control unit 124 may control the display of the input data. Alternatively, the display control unit 124, when controlling the display of the display screen of the evaluation result, may control the display unit 150, so that the display unit 150 may display input data with a high possibility that the label is erroneous. In the example illustrated in FIG. 13, a label R20 of "Cat" is attached to the input data Im20 that is the cat image, and a label R40 of "Cat" is attached to the input data Im40 that is the cat image.

Moreover, it is also expected that there is a user who attaches or modifies a label with malicious intent to acquire points. In addition, there is a possibility that the user may erroneously attach or modify a label. Thus, the data processing unit 223 identifies labels that are input from a plurality of users, then may check attachment or change of labels and may execute addition processing on the earned points of users who attaches or changes the label.

Further, it is undesirable that the character string described as a label varies depending on the user who inputs it, and so it is desirable to have uniformity to some extent. Thus, the display control unit 124 may predict and display the entire label following the first character at the stage when the user inputs the first character of the label. In addition, here, the example is described in which addition process is executed on the earned point of a user who attaches or changes a label. However, the data processing unit 223 may perform addition process on the earned point of a user who uploads the data set to which the label is attached.

Figure 14:
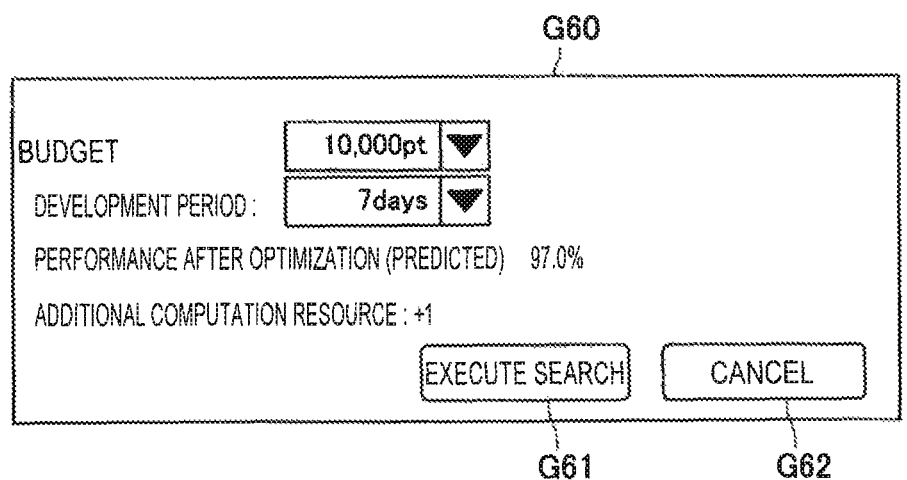
FIG. 14 is a diagram illustrating an example of a condition input screen.

In the above description, the user specifies the number of additional computation nodes, but the number of additional computation nodes may be proposed to the user. FIG. 14 is a diagram illustrating an example of a condition input screen. As illustrated in FIG. 14, a condition input screen G60 includes a selection column for a budget (upper limit cost applied to a learning process by the additional computation node) and a selection column for a development period (upper limit time applied to a learning process). In addition, as illustrated in FIG. 14, the condition input screen G60 includes the prediction performance after being optimized depending on the budget and development period and the number of additional operation resources (additional computation nodes).

More specifically, in the case where the user specifies the budget and the development period, the display control unit 124 controls the display of the upper limit number of additional operation nodes that can be added depending on a point that does not exceed the budget and the time that does not exceed the development period. In addition, the display control unit 124 controls the display of the prediction performance of the network after addition of the addition computation nodes of the upper limit number. In the example illustrated in FIG. 14, it is determined that the optimum number of additional computation resources (additional computation nodes) is "1" (i.e., two-parallel execution in which one single computation node and one additional computation node are combined). This will be described with reference to FIG. 15.

Figure 15:
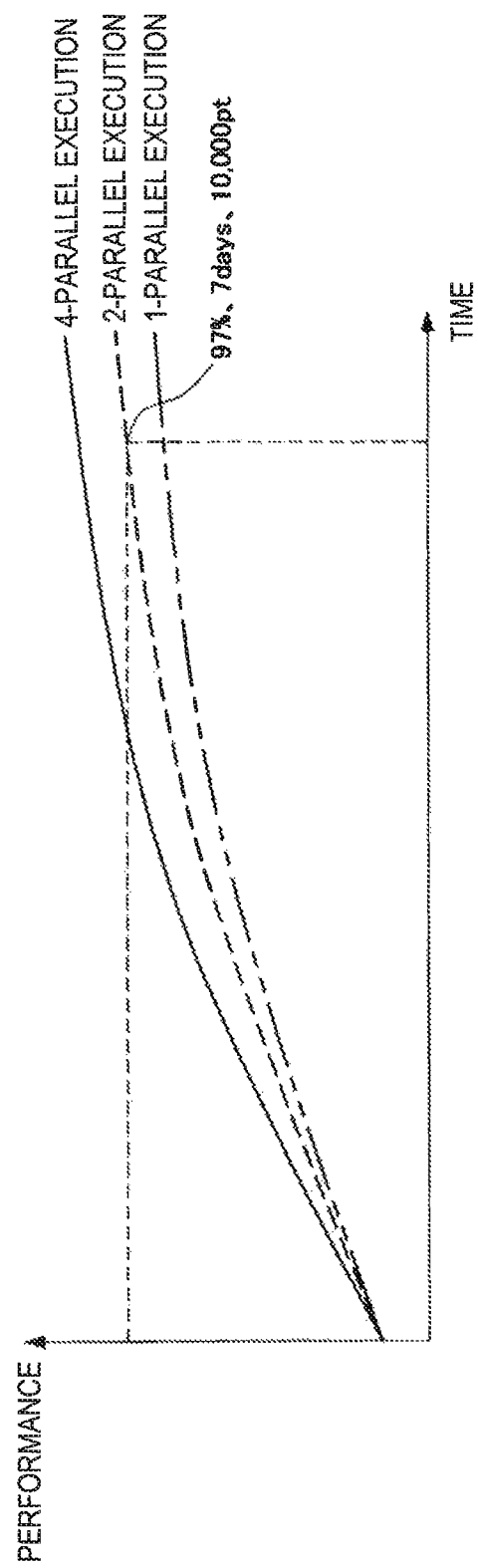
FIG. 15 is a diagram illustrating an example of the relationship between an elapsed time from start of a learning process and the performance of a network.

FIG. 15 is a diagram illustrating an example of the relationship between the elapsed time from the start of a learning process and the performance of the network. As illustrated in FIG. 15, when the learning process is started, the performance increases with the lapse of time. In addition, as the number of parallel execution processes increases, the performance rising speed increases. As illustrated in FIG. 14, it is assumed that the user specifies "10000 points" as the budget and "7 days" as the development period. In such a case, if there is four-parallel execution, the performance reaches 97% at a time point when 3.5 days elapse after the start of the learning process, but it is out of the budget.

Figure 16:
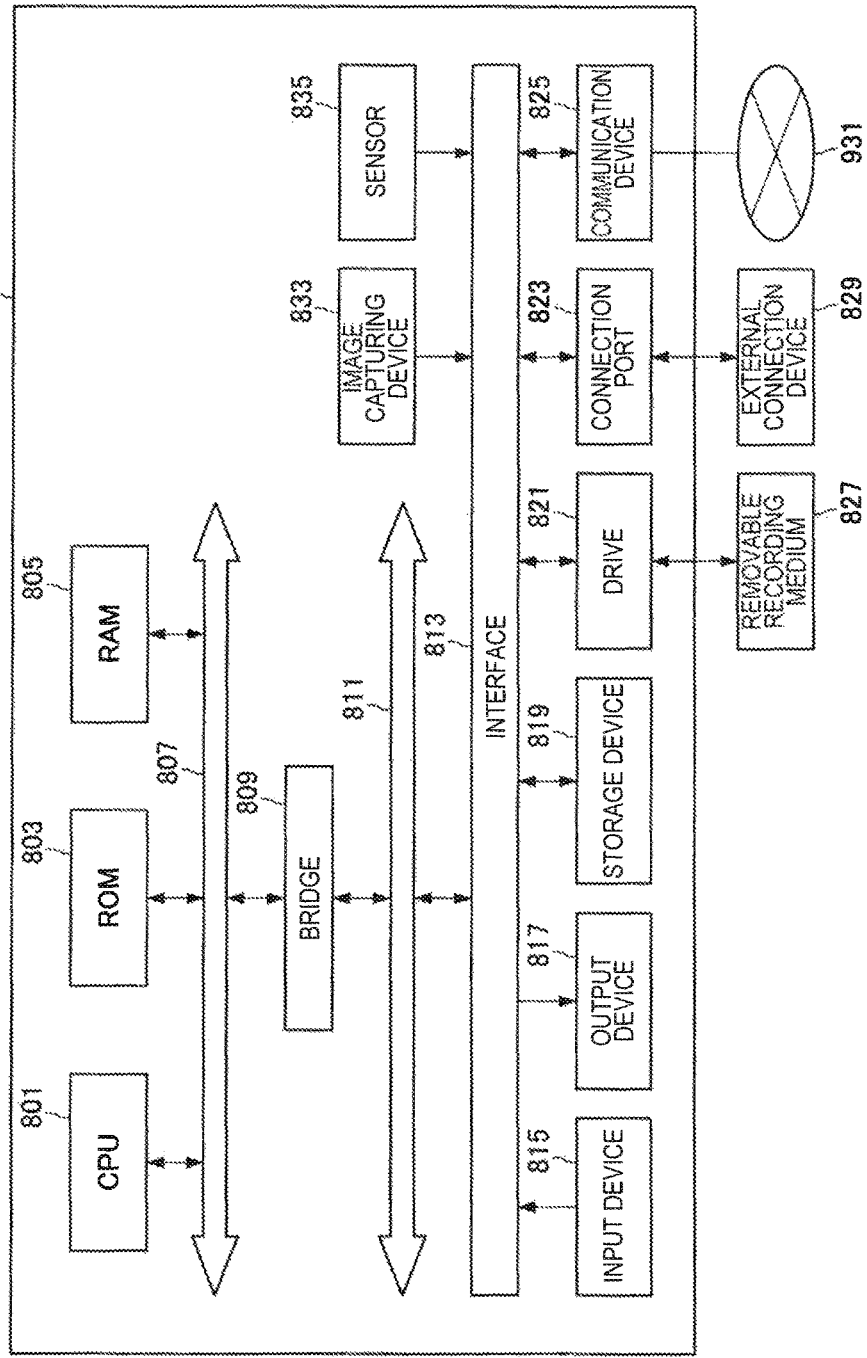
FIG. 16 is a block diagram illustrating a hardware configuration example of the information processing device.

On the other hand, if there is one-parallel execution, in the case where the budget is 10000 points or less, the performance is 95% (does not reach 97%) at a time point when 7 days elapse from the start of a learning process. Thus, in order for the budget to be 8000 points and for the performance to reach 97%, "10 days" are necessary as the development period. If there is two-parallel execution, in the case the budget is 10000 points, the performance reaches 97% at a time point when 7 days elapse after the start of a learning process, and so the performance of "97%" and the budget and development period specified by the user are satisfied. Thus, the display control unit 124 may control the display of "1" as the number of additional computation nodes, 1.4. Hardware Configuration Example Next, the hardware configuration of the information processing device 10 according to an embodiment of the present disclosure is described with reference to FIG. 16. FIG. 16 is a block diagram illustrating a hardware configuration example of the information processing device 10 according to an embodiment of the present disclosure.

As illustrated in FIG. 16, the information processing device 10 includes a central processing unit (CPU) 801, a read-only memory (ROM) 803, and a random-access memory (RAM) 805. In addition, the information processing device 10 may include a host bus 807, a bridge 809, an external bus 811, an interface 813, an input device 815, an output device 817, a storage device 819, a drive 821, a connection port 823, and a communication device 825. The information processing device 10 may further include an image capturing device 833 and a sensor 835 as necessary. In conjunction with, or in place of, the CPU 801, the information processing device 10 may have a processing circuit called a digital signal processor (DSP) or application specific integrated circuit (ASIC).

The CPU 801 functions as an arithmetic processing unit and a control unit, and controls the overall operation in the information processing device 10 or a part thereof in accordance with various programs recorded in the ROM 803, the RAM 805, the storage device 819, or a removable recording medium 827. The ROM 803 stores, in one example, programs and operation parameters used by the CPU 801. The RAM 805 temporarily stores programs used in the execution by the CPU 801 and parameters that vary as appropriate in the execution. The CPU 801, the ROM 803, and the RAM 805 are connected with each other via the host bus 807 that is composed of an internal bus such as a CPU bus. Furthermore, the host bus 807 is connected to the external bus 811 such as peripheral component interconnect/interface (PCI) bus via the bridge 809.

The input device 815 is, in one example, a device operated by a user, such as a mouse, a keyboard, a touch panel, a button, a switch, and a lever. The input device 815 may include a microphone for detecting user's speech. The input device 815 may be, in one example, a remote control device using infrared rays or other radio waves, or may be an external connection device 829 such as a cellular phone that supports the operation of the information processing device 10. The input device 815 includes an input control circuit that generates an input signal on the basis of the information input by the user and outputs it to the CPU 801. The user operates the input device 815 to input various data to the information processing device 10 and to instruct the information processing device 10 to perform a processing operation. In addition, the image capturing device 833, which will be described later, can also function as an input device by capturing the motion of the user's hand, user's finger, or the like. In this case, the pointing position may be determined depending on the motion of the hand or the direction of the finger.

The output device 817 is composed of a device capable of notifying visually or audibly the user of the acquired information. The output device 817 may be a display device such as a liquid crystal display (LCD), a plasma display panel (PDP), an organic electroluminescence (EL) display, and a projector, a hologram display device, an audio output device such as a speaker and a headphone, as well as printer devices or the like. The output device 817 outputs the result obtained by the processing of the information processing device 10 as a video such as a text or an image, or outputs it as audio such as a speech or sound. In addition, the output device 817 may include, in one example, a light for lighting up the surroundings.

The storage device 819 is a data storage device configured as an example of a storage portion of the information processing device 10. The storage device 819 is composed of, in one example, a magnetic storage device such as hard disk drive (HDD), a semiconductor storage device, an optical storage device, and a magneto-optical storage device. The storage device 819 stores programs executed by the CPU 801, various data, various types of data obtained from the outside, and the like.

The drive 821 is a reader-writer for a removable recording medium 827 such as a magnetic disk, an optical disk, a magneto-optical disk, and a semiconductor memory, and is incorporated in the information processing device 10 or externally attached thereto. The drive 821 reads the information recorded on the loaded removable recording medium 827 and outputs it to the RAM 805. In addition, the drive 821 writes a record in the loaded removable recording medium 827.

The connection port 823 is a port for directly connecting the device to the information processing device 10. The connection port 823 may be, in one example, a universal serial bus (USB) port, an IEEE 1394 port, or a small computer device interface (SCSI) port. In addition, the connection port 823 may be, in one example, an RS-232C port, an optical audio terminal, or high-definition multimedia interface (HDMI, registered trademark) port. The connection of the external connection device 829 to the connection port 823 makes it possible to exchange various kinds of data between the information processing device 10 and the external connection device 829.

The communication device 825 is, in one example, a communication interface composed of a communication device or the like, which is used to be connected to the communication network 931. The communication device 825 may be, in one example, a communication card for wired or wireless local area network (LAN), Bluetooth (registered trademark), or wireless USB (WUSB). In addition, the communication device 825 may be, in one example, a router for optical communication, a router for asymmetric digital subscriber line (ADSL), or a modem for various communications. The communication device 825 transmits and receives signals or the like using a predetermined protocol such as TCP/IP, in one example, with the Internet or other communication devices. In addition, the communication network 931 connected to the communication device 825 is a network connected by wire or wireless, and is, in one example, the Internet, home LAN, infrared communication, radio wave communication, satellite communication, or the like.

The image capturing device 833 is a device that captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 833 may capture a still image or a moving image.

The sensor 835 is, in one example, various sensors such as an acceleration sensor, a gyro sensor, a geomagnetic sensor, an optical sensor, and a sound sensor. The sensor 835 acquires information on the state of the information processing device 10 such as the attitude of the casing of the information processing device 10, and acquires information on the surrounding environment of the information processing device 10 such as brightness or noise around the information processing device 10. The sensor 835 may also include a GPS sensor that receives global positioning system (GPS) signals and measures the latitude, longitude, and altitude of the device.

Next, the hardware configuration of the information providing device 20 according to an embodiment of the present disclosure is described with reference to FIG. 17. FIG. 17 is a block diagram illustrating a hardware configuration example of the information providing device 20 according to an embodiment of the present disclosure.

As illustrated in FIG. 17, the information providing device 20 includes a central processing unit (CPU) 901, a read-only memory (ROM) 903, and a random-access memory (RAM) 905. In addition, the information providing device 20 may include a host bus 907, a bridge 909, an external bus 911, an interface 913, an input device 915, an output device 917, a storage device 919, a drive 921, a connection port 923, and a communication device 925. In conjunction with, or in place of, the CPU 901, the information processing device 10 may have a processing circuit called a digital signal processor (DSP) or application specific integrated circuit (ASIC).

The CPU 901 functions as an arithmetic processing unit and a control unit, and controls the overall operation in the information providing device 20 or a part thereof in accordance with various programs recorded in the ROM 903, the RAM 905, the storage device 919, or a removable recording medium 927. The RUM 903 stores, in one example, programs and operation parameters used by the CPU 901. The RAM 905 temporarily stores programs used in the execution by the CPU 901 and parameters that vary as appropriate in the execution. The CPU 901, the ROM 903, and the RAM 905 are connected with each other via the host bus 907 that is composed of an internal bus such as a CPU bus. Furthermore, the host bus 907 is connected to the external bus 911 such as peripheral component interconnect/interface (PCI) bus via the bridge 909.

The storage device 919 is a data storage device configured as an example of a storage portion of the information providing device 20. The storage device 919 is composed of, in one example, a magnetic storage device such as hard disk drive (HDD), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information providing device 20 or externally attached thereto. The drive 921 reads the information recorded on the loaded removable recording medium 927 and outputs it to the RAM 905. In addition, the drive 921 writes a record in the loaded removable recording medium 927.

The connection port 923 is a port for directly connecting the device to the information providing device 20. The connection port 923 may be, in one example, a universal serial bus (USB) port, an IEEE 1394 port, or a small computer system interface (SCSI) port. In addition, the connection port 923 may be, in one example, an RS-232C port, an optical audio terminal, or high-definition multimedia interface (HDMI, registered trademark) port. The connection of the external connection device 929 to the connection port 923 makes it possible to exchange various kinds of data between the information providing device 20 and the external connection device 929.

The communication device 925 is, in one example, a communication interface composed of a communication device or the like, which is used to be connected to a communication network 931. The communication device 925 may be, in one example, a communication card for wired or wireless local area network (LAN), Bluetooth (registered trademark), or wireless USB (WUSB). In addition, the communication device 925 may be, in one example, a router for optical communication, a router for asymmetric digital subscriber line (ADSL), or a modem for various communications. The communication device 925 transmits and receives signals or the like using a predetermined protocol such as TCP/IP, in one example, with the Internet or other communication devices. In addition, the communication network 931 connected to the communication device 925 is a network connected by wire or wireless, and is, in one example, the Internet, home LAN, infrared communication, radio wave communication, satellite communication, or the like.

2. CONCLUSION

As described above, according to the embodiment of the present disclosure, there is provided the information processing device 10 including the display control unit 124 configured to control the display of the information indicating the progress of the learning process and the additional button used to dynamically add the second hardware resource for executing the learning process to the first hardware resource during execution of the learning process. Such configuration makes it possible to add intuitively a hardware resource for executing the learning.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the above description is given of the case where it is possible to press the distributed computation resource addition button G12 once and the case where it is possible to press the parallel computation resource addition button G13 once are described. However, even after one of the distributed computation resource addition button G12 and the parallel computation resource addition button G13 is pressed and a computation resource is added, it may be possible to press the distributed computation resource addition button G12 or the parallel computation resource addition button G13. In such a case, the display control unit 124 may control the display of the distributed computation check screen G20 or the parallel computation check screen G30.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a display control unit configured to control display of information indicating progress of a learning process and an addition button used to add dynamically a second hardware resource intended to execute the learning process to a first hardware resource on which the learning process is being executed.

(2)
The information processing device according to (1),
in which, during execution of the learning process by the second hardware resource, a cost corresponding to the number of second hardware resources is subtracted from a balance at predetermined time intervals.

(3)
The information processing device according to (2),
in which, in a case where a first addition button is detected to be pressed, the second hardware resource intended to execute a learning process of a network subjected to the learning process being executed by the first hardware resource in distribution with the first hardware resource is added.

(4)
The information processing device according to (3),
in which, in the case where the first addition button is detected to be pressed, the learning process being executed by the first hardware resource is held until the learning process is capable of being paused, and then the learning process is distributed between the first hardware resource and as many of the second hardware resources as a user-specified number and executed by the first hardware resource and the second hardware resources.

(5)
The information processing device according to (3) or (4),
in which, in a case where the balance falls below a predetermined value, the learning process being executed by the first hardware resource is held until the learning process is capable of being paused, and then the learning process by the second hardware resource is stopped and the learning process by the first hardware resource is resumed.

(6)
The information processing device according to (2),
in which, in a case where a second addition button is detected to be pressed, the second hardware resource intended to execute a learning process of a network different from a network subjected to the learning process executed by the first hardware resource in parallel with the learning process by the first hardware resource is added.

(7)
The information processing device according to (6),
in which, in a case where the second addition button is detected to be pressed and there are one or a plurality of paused learning processes, some or all of the second hardware resources are assigned to each of the paused learning processes one by one and the paused learning process is resumed by the assigned second hardware resources.

(8)
The information processing device according to (7),
in which the learning process of the network is executed individually by each of the second hardware resources that are not assigned to the paused learning process.

(9)
The information processing device according to any one of (6) to (8),
in which, in a case where the balance falls below a predetermined value, the learning process by the second hardware resource is stopped.

(10)
The information processing device according to any one of (2) to (9),
in which, in a case where an operation for increasing the balance is detected, an addition process is executed on the balance.

(11)
The information processing device according to any one of (2) to (10),
in which, in a case where a share button used to share a result obtained by the learning is detected to be pressed, a network structure in which the learning process is executed and a data set used for the learning process or identification information of the data set and performance of the network structure are shared in a user-specified range.

(12)
The information processing device according to (11),
in which, in a case where the share button is detected to be pressed, an addition process is executed on the balance.

(13)
The information processing device according to any one of (2) to (12),
in which, in a case where a label to input data used for the learning process is detected to be attached or changed, an addition process is executed on the balance.

(14)
The information processing device according to any one of (1) to (13),
in which the display control unit controls display of at least one of an estimated learning necessary time and an estimated learning end time by the first hardware resource and the second hardware resource on the basis of the number of second hardware resources.

(15)
The information processing device according to any one of (1) to (14),
in which the display control unit controls display of a cost corresponding to the number of second hardware resources.

(16)
The information processing device according to (15), in which the cost includes at least one of a cost taken at predetermined time intervals and a cost taken until the learning process is completed.

(17)
The information processing device according to any one of (1) to (6), including:
an operation acquisition unit configured to acquire an operation used to specify the number of second hardware resources.

(18)
The information processing device according to any one of (1) to (7),
in which the display control unit, in a case where a user specifies an upper limit cost taken for the learning process by the second hardware resource and an upper limit time taken for the learning process, controls display of an upper limit number of the second hardware resources that is capable of being added depending on a cost not exceeding the upper limit cost and a time not exceeding the upper limit time.

(19)
A method of processing information, the method including:
controlling, by a processor, display of information indicating progress of a learning process and an addition button used to add dynamically a second hardware resource intended to execute the learning process to a first hardware resource on which the learning process is being executed.

(20)
A method of providing information, the method including:
providing information indicating progress of a learning process; and
adding, when an addition button used to add dynamically a second hardware resource intended to execute the learning process to a first hardware resource on which the learning process is being executed is pressed, the second hardware resource.

REFERENCE SIGNS LIST 1 information processing system
10 information processing device
110 operation unit
120 control unit
121 operation acquisition unit
122 transmission control unit
123 data acquisition unit
124 display control unit
130 communication unit
140 storage unit
150 display unit
20 information providing device
220 control unit
221 acquisition unit
222 learning processing unit
223 data processing unit
224 transmission control unit
230 communication unit
240 storage unit

The invention claimed is:

1. An information processing device comprising:
a display control unit configured to control display of information indicating progress of a learning process and an addition button used to add dynamically one or more second hardware resources intended to execute the learning process to a first hardware resource on which the learning process is being executed,
wherein, during execution of the learning process by the one or more second hardware resources, a cost corresponding to the one or more second hardware resources is subtracted from a balance,
wherein, in a case where an operation for increasing the balance is detected, an addition process is executed on the balance, and
wherein the display control unit is implemented via at least one processor.

2. The information processing device according to claim 1,
wherein the cost corresponds to a number of the one or more second hardware resources, and is subtracted from the balance at predetermined time intervals.

3. The information processing device according to claim 2,
wherein, in a case where a first addition button is detected to be pressed, the one or more second hardware resources intended to execute the learning process of a network subjected to the learning process being executed by the first hardware resource in distribution with the first hardware resource is added.

4. The information processing device according to claim 3,
wherein, in the case where the first addition button is detected to be pressed, the learning process being executed by the first hardware resource is held until the learning process is capable of being paused, and then the learning process is distributed between the first hardware resource and as many of the one or more second hardware resources as a user-specified number and executed by the first hardware resource and the one or more second hardware resources.

5. The information processing device according to claim 3,
wherein, in a case where the balance falls below a predetermined value, the learning process being executed by the first hardware resource is held until the learning process is capable of being paused, and then the learning process by the one or more second hardware resources is stopped and the learning process by the first hardware resource is resumed.

6. The information processing device according to claim 2,
wherein, in a case where a second addition button is detected to be pressed, the one or more second hardware resources intended to execute the learning process of a network different from a network subjected to the learning process executed by the first hardware resource in parallel with the learning process by the first hardware resource is added.

7. The information processing device according to claim 6,
wherein, in a case where the second addition button is detected to be pressed and there are one or a plurality of paused learning processes, some or all of the one or more second hardware resources are assigned to each paused learning process of the plurality of paused learning processes one by one and the plurality of paused learning processes are resumed by the assigned second hardware resources.

8. The information processing device according to claim 7,
wherein the learning process of the network is executed individually by each of the one or more second hardware resources that are not assigned to the plurality of paused learning processes.

9. The information processing device according to claim 6,
wherein, in a case where the balance falls below a predetermined value, the learning process by the one or more second hardware resources is stopped.

10. The information processing device according to claim 2,
wherein, in a case where a share button used to share a result obtained by the learning process is detected to be pressed, a network structure in which the learning process is executed and a data set used for the learning process or identification information of the data set and performance of the network structure are shared in a user-specified range.

11. The information processing device according to claim 10,
wherein, in a case where the share button is detected to be pressed, an addition process is executed on the balance.

12. The information processing device according to claim 2,
wherein, in a case where a label to input data used for the learning process is detected to be attached or changed, an addition process is executed on the balance.

13. The information processing device according to claim 1,
wherein the display control unit controls display of at least one of an estimated learning necessary time and an estimated learning end time by the first hardware resource and the one or more second hardware resources on the basis of a number of the one or more second hardware resources.

14. The information processing device according to claim 1,
wherein the display control unit controls display of a cost corresponding to a number of the one or more second hardware resources.

15. The information processing device according to claim 14,
wherein the cost includes at least one of a cost taken at predetermined time intervals and a cost taken until the learning process is completed.

16. The information processing device according to claim 1, further comprising:
an operation acquisition unit configured to acquire an operation used to specify a number of the one or more second hardware resources,
wherein the operation acquisition unit is implemented via at least one processor.

17. The information processing device according to claim 1,
wherein the display control unit, in a case where a user specifies an upper limit cost taken for the learning process by the one or more second hardware resources and an upper limit time taken for the learning process, controls display of an upper limit number of the one or more second hardware resources that is capable of being added depending on a cost not exceeding the upper limit cost and a time not exceeding the upper limit time.

18. A method of processing information, the method comprising:
controlling, by a processor, display of information indicating progress of a learning process and an addition button used to add dynamically one or more second hardware resources intended to execute the learning process to a first hardware resource on which the learning process is being executed,
wherein, during execution of the learning process by the one or more second hardware resources, a cost corresponding to the one or more second hardware resources is subtracted from a balance, and
wherein, in a case where an operation for increasing the balance is detected, an addition process is executed on the balance.

19. A method of providing information, the method comprising:
providing, by a processor for display, information indicating progress of a learning process; and
adding, by the processor, when an addition button used to add dynamically one or more second hardware resources intended to execute the learning process to a first hardware resource on which the learning process is being executed is pressed, the second hardware resource,
wherein, during execution of the learning process by the one or more second hardware resources, a cost corresponding to the one or more second hardware resources is subtracted from a balance, and
wherein, in a case where an operation for increasing the balance is detected, an addition process is executed on the balance.

* * * * *